(12) United States Patent
Zhang et al.

(10) Patent No.: US 12,105,561 B2
(45) Date of Patent: Oct. 1, 2024

(54) ROLLABLE DISPLAY DEVICE

(71) Applicant: SUZHOU CHINA STAR OPTOELECTRONICS TECHNOLOGY CO., LTD., Suzhou (CN)

(72) Inventors: Shuai Zhang, Suzhou (CN); Wenbing Zhang, Suzhou (CN); Feng Gao, Suzhou (CN); Yalong Li, Suzhou (CN)

(73) Assignee: SUZHOU CHINA STAR OPTOELECTRONICS TECHNOLOGY CO., LTD., Suzhou (CN)

( * ) Notice: Subject to any disclaimer, the term of this patent is extended or adjusted under 35 U.S.C. 154(b) by 211 days.

(21) Appl. No.: 17/781,036

(22) PCT Filed: May 19, 2022

(86) PCT No.: PCT/CN2022/093852
§ 371 (c)(1),
(2) Date: May 30, 2022

(87) PCT Pub. No.: WO2023/206664
PCT Pub. Date: Nov. 2, 2023

(65) Prior Publication Data
US 2023/0350461 A1    Nov. 2, 2023

(30) Foreign Application Priority Data
Apr. 29, 2022 (CN) .......... 202210474071.X

(51) Int. Cl.
*G06F 1/16* (2006.01)

(52) U.S. Cl.
CPC .......... *G06F 1/1652* (2013.01); *G06F 1/1656* (2013.01)

(58) Field of Classification Search
CPC ............... G06F 1/1652; G06F 1/1656
See application file for complete search history.

(56) References Cited

U.S. PATENT DOCUMENTS 10,571,969 B2 * 2/2020 Yeh .................. G06F 1/1601
D883,244 S * 5/2020 Kim ..................... D14/129
(Continued)

FOREIGN PATENT DOCUMENTS

| CN | 107256679 A | 10/2017 |
| CN | 108040154 A | 5/2018 |

(Continued)

OTHER PUBLICATIONS

PCT International Search Report for International Application No. PCT/CN2022/093852, mailed Dec. 15, 2022, 10pp.

(Continued)

*Primary Examiner* — Adrian S Wilson
(74) *Attorney, Agent, or Firm* — The Roy Gross Law Firm, LLC; Roy Gross

(57) ABSTRACT

A rollable display device is provided. The rollable display device includes a flexible display panel, a storage mechanism, and an actuating mechanism. The storage mechanism includes a rotary component. The rotary component includes a rotary member and a rotating shaft member rotatably connected to the rotary member. The aforesaid rollable display device allows the flexible display panel to realize bidirectional stretching under movement of the actuating mechanism, thereby increasing a rolled-up radius of the flexible display panel.

17 Claims, 8 Drawing Sheets

(56) References Cited

U.S. PATENT DOCUMENTS

| | | | |
|---|---|---|---|
| 10,750,625 B2 * | 8/2020 | Park | G06F 1/1652 |
| 10,936,016 B2 * | 3/2021 | Zhang | G06F 1/1652 |
| D951,217 S * | 5/2022 | Pyo | D14/126 |
| 2019/0138058 A1 | 5/2019 | Kwon et al. | |

FOREIGN PATENT DOCUMENTS

| | | |
|---|---|---|
| CN | 110111692 A | 8/2019 |
| CN | 110120182 A | 8/2019 |
| CN | 110189634 A | 8/2019 |
| CN | 110534024 A | 12/2019 |
| CN | 111445791 A | 7/2020 |
| CN | 111508364 A | 8/2020 |
| CN | 113734910 A | 12/2021 |
| CN | 113948006 A | 1/2022 |
| WO | 2018186631 A1 | 10/2018 |

OTHER PUBLICATIONS

PCT Written Opinion for for International Application No. PCT/CN2022/093852, mailed Dec. 15, 2022, 8pp.
Chinese Office Action issued in corresponding Chinese Patent Application No. 202210474071.X dated Nov. 22, 2022, pp. 1-11.

\* cited by examiner

ROLLABLE DISPLAY DEVICE

This application is a National Phase of PCT Patent Application No. PCT/CN2022/093852 having International filing date of May 19, 2022, which claims the benefit of priority of Chinese Application No. 202210474071.X, filed Apr. 29, 2022, the contents of which are all incorporated herein by reference in their entirety.

BACKGROUND OF INVENTION

Field of Invention

The present application relates to the field of display technology and specifically relates to a rollable display device.

Description of Prior Art

With increment of market requirements for flexible displays, more and more attention has been paid to research and development of various flexible display devices. For example, switch of display devices between a tablet mode and a mobile phone mode is allowed in rollable display devices that have been developed and used, and rolling up and unrolling of flexible screens can be realized through elements such as a series of hinges, or pillars, etc.

A rolled-up solution with a single rotating shaft of one way direction is generally used in current rollable display devices. The rollable display devices mainly include a roller shaft and a flexible screen. A rotating shaft is disposed in the roller shaft. An opening is defined in the roller shaft. The flexible screen is rolled up on the rotating shaft. One end on the flexible screen is connected to the rotating shaft, and another end thereof can be expanded from the opening. However, during a usage process of the rollable display devices, when a part of the flexible screen is stretched, as a rolled-up radius of the flexible screen rolled up on the shaft is too small, and relative positions of the rotating shaft and the openings are fixed, so the flexible screen is squeezed by the opening or the rotating shaft, thereby leading to problems such as generation of scratches during a rolled-up process of the flexible screen.

Therefore, a rollable display device is urgently needed to provide to solve the aforesaid technical problems.

One of the technical problems is that flexible screens of current rollable display devices are damaged incurred by being squeezed against openings of roller shafts or inner walls during unrolled and rolled-up processes.

SUMMARY OF INVENTION

Embodiments of the present application provide a rollable display device, including a flexible display panel, a storage mechanism, and an actuating mechanism. A rotary component is disposed in the storage mechanism. The rotary component in the storage mechanism is configured to roll up the flexible display panel. The storage mechanism is configured to store the flexible display panel that is rolled. The actuating mechanism is fixedly connected to the storage mechanism. Wherein, the rotary component includes a rotary member and a rotating shaft member. The rotating shaft member is rotatably connected to the rotary member. The rotating shaft member includes a first rotating shaft and a second rotating shaft. The actuating mechanism includes a first actuating component and a second actuating component. The storage mechanism is located between the first actuating component and the second actuating component. The first actuating component is fixedly connected to a first end of the flexible display panel. The second actuating component is fixedly connected to a second end of the flexible display panel.

Wherein, when the first actuating component and the second actuating component slide relative to each other, a rotation direction of the first rotating shaft is opposite to a rotation direction of the second rotating shaft, and at least one end of the flexible display panel moves away from or close to the storage mechanism.

In the rollable display device of the present application, by storing the flexible display panel that is rolled by the storage mechanism, by disposing the first actuating component and the second actuating component on two sides of the storage mechanism respectively at a same time, by fixedly connecting the first actuating component to the first end of the flexible display panel, and by fixedly connecting the second actuating component to the second end of the flexible display panel, when the first actuating component and the second actuating component slide relative to each other, at least one end of the flexible display panel moves away from or close to the storage mechanism, and a rotation direction of the first rotating shaft is opposite to a rotation direction of the second rotating shaft. Therefore, bidirectional stretching is allowed to realize in the flexible display panel under movement of the actuating mechanism, thereby increasing a rolled-up radius of the flexible display panel. In this way, the stored part of the flexible display panel is always substantially kept on the rotary component during the unrolled and rolled-up processes, which prevents the problem that the flexible display panel is damaged incurred by being squeezed against the storage structure during the unrolled and rolled-up processes.

DETAILED DESCRIPTION OF EMBODIMENTS

Figure 1:
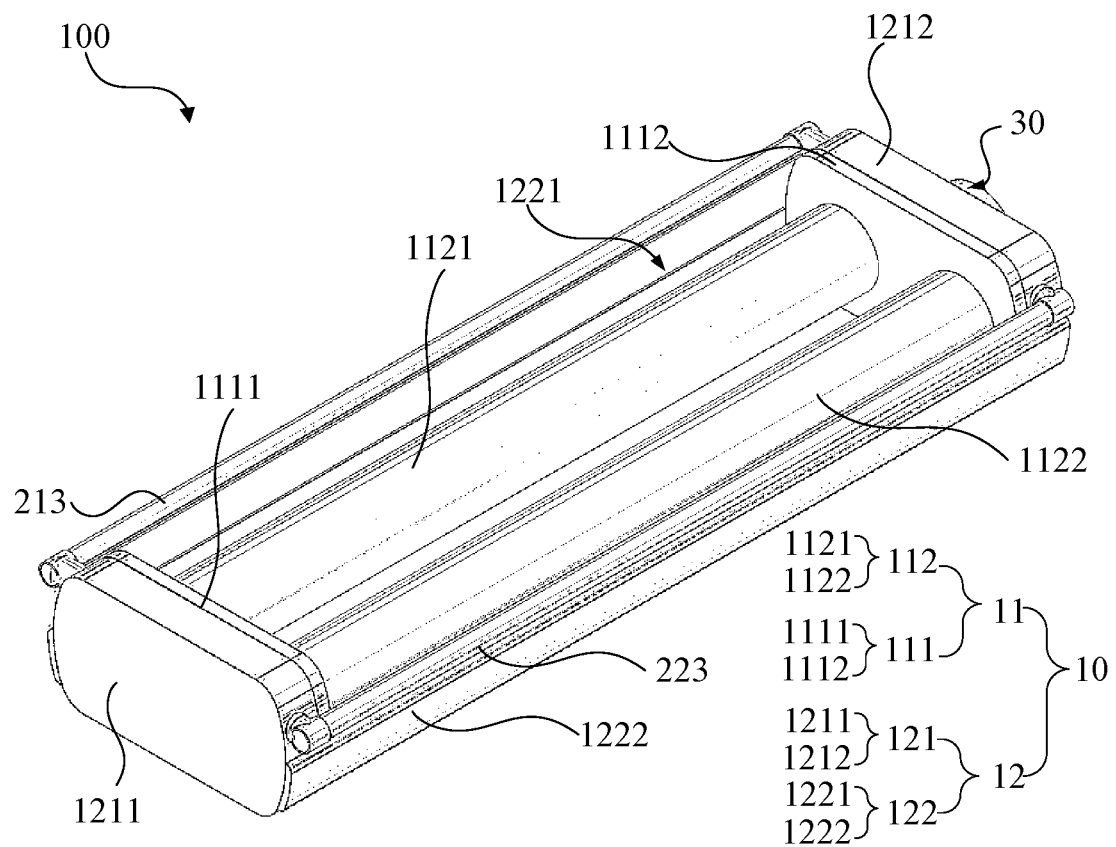
FIG. 1 is a structural schematic diagram of a storage mechanism and an actuating mechanism of a rollable display device provided by one embodiment of the present application in a completely rolled-up state.

Embodiments of the present application address to the technical problem that flexible screens of current rollable display devices are damaged incurred by being squeezed against openings of roller shafts or inner walls during unrolled and rolled-up processes. The embodiments of the present application can remedy the aforesaid technical problem.

Please refer to FIG. 1 to FIG. 13. One embodiment of the present application provides a rollable display device 100. The rollable display device 100 includes a flexible display panel 40, a storage mechanism 10, and an actuating mechanism 20. A rotary component 11 is disposed in the storage mechanism 10. The rotary component 11 includes a rotary member 111 and a rotating shaft member 111 rotatably connected to the rotary member 112. The rotating shaft member 112 includes a first rotating shaft 1121 and a second rotating shaft 1122. The rotary component 11 in the storage mechanism 10 is configured to roll up the flexible display panel 40. The storage mechanism 10 is configured to store the flexible display panel 40 that is rolled. The actuating mechanism 20 is fixedly connected to the storage mechanism 10. The actuating mechanism 20 includes a first actuating component 21 and a second actuating component 22. The storage mechanism 10 is located between the first actuating component 21 and the second actuating component 22. The first actuating component 21 is fixedly connected to a first end of the flexible display panel 40. The second actuating component 22 is fixedly connected to a second end of the flexible display panel 40. Wherein, when the first actuating component 21 and the second actuating component 22 slide relative to each other, a rotation direction of the first rotating shaft 1121 is opposite to a rotation direction of the second rotating shaft 1122, and at least one end of the flexible display panel 40 moves away from or close to the storage mechanism 10.

In the aforesaid rollable display device 100 provided by the embodiments of the present application, by storing the flexible display panel 40 that is rolled by the storage mechanism 10, by disposing the first actuating component 21 and the second actuating component 22 on two sides of the storage mechanism 10 respectively at a same time, by fixedly connecting the first actuating component 21 to the first end of the flexible display panel 40, and by fixedly connecting the second actuating component 22 to the second end of the flexible display panel 40, when the first actuating component 21 and the second actuating component 22 slide relative to each other, at least one end of the flexible display panel 40 moves away from or close to the storage mechanism 10. Therefore, bidirectional stretching is allowed to realize in the flexible display panel 40 under movement of the actuating mechanism 20, thereby increasing a rolled-up radius of the flexible display panel 40. In this way, the stored part of the flexible display panel 40 is always substantially kept on the rotary component 11 during the unrolled and rolled-up processes, which prevents the problem that the flexible display pane 40 is damaged incurred by being squeezed against the storage structure during the unrolled and rolled-up processes.

Now, the technical solutions of the present application are described with reference to specific embodiments.

Figure 2:
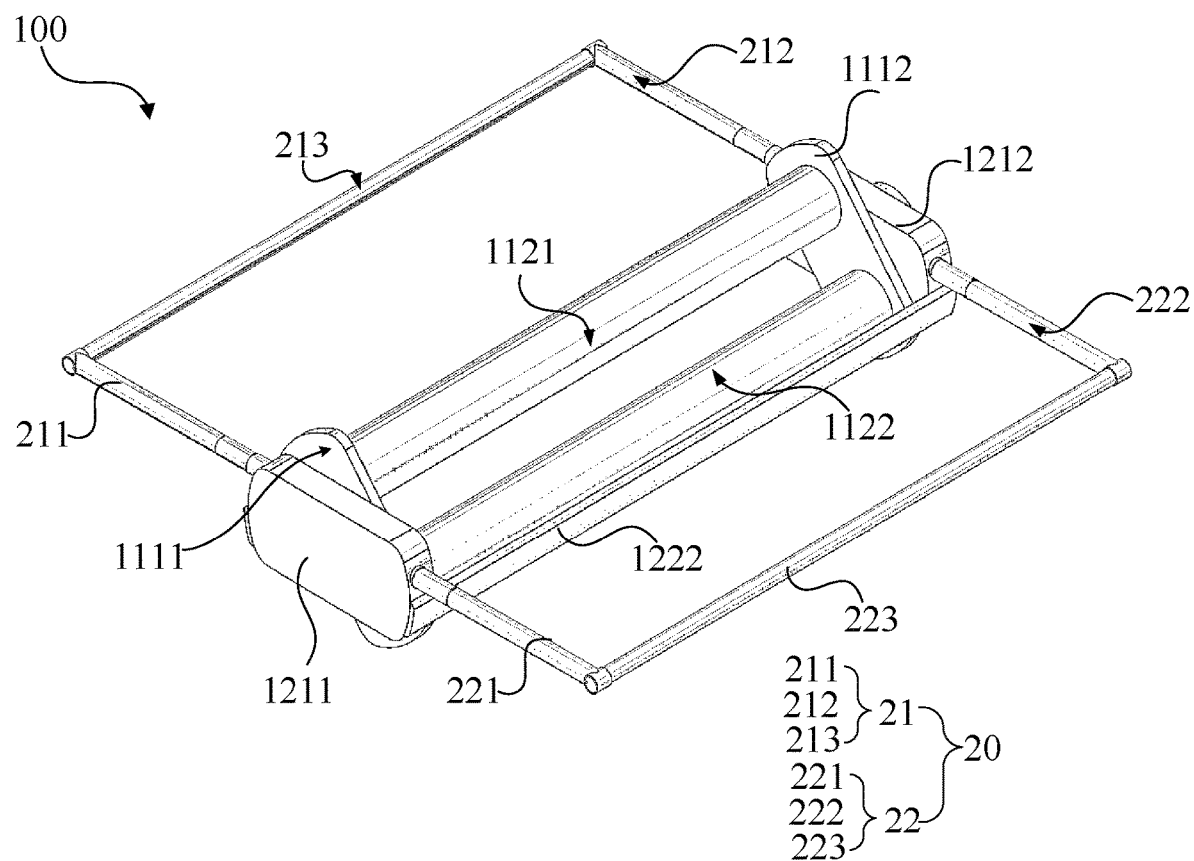
FIG. 2 is a structural schematic diagram of the storage mechanism and the actuating mechanism of the rollable display device provided by one embodiment of the present application in a partially unrolled state.
Figure 3:
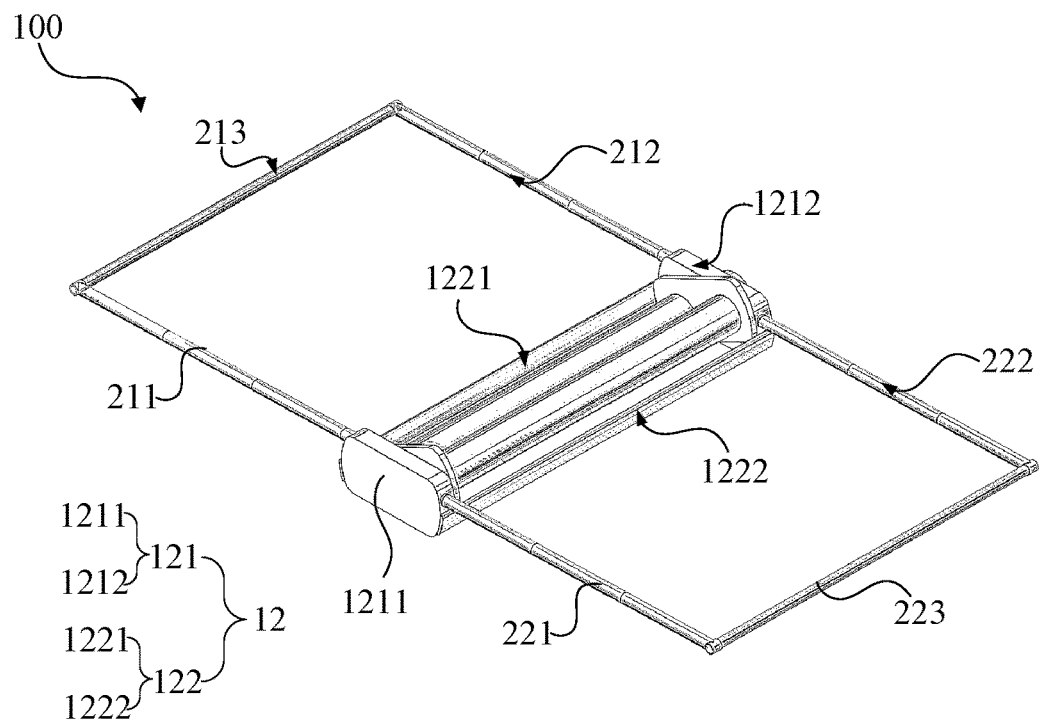
FIG. 3 is a structural schematic diagram of the storage mechanism and the actuating mechanism of the rollable display device provided by one embodiment of the present application in a nearly completely unrolled state.

Illustrated in FIG. 1 is a structural schematic diagram of the storage mechanism 10 and the actuating mechanism 20 of the rollable display device 100 provided by one embodiment of the present application in a completely rolled-up state. Illustrated in FIG. 2 is a structural schematic diagram of the storage mechanism 10 and the actuating mechanism 20 of the rollable display device 100 provided by one embodiment of the present application in a partially unrolled state. Illustrated in FIG. 3 is a structural schematic diagram of the storage mechanism 10 and the actuating mechanism 20 of the rollable display device 100 provided by one embodiment of the present application in a nearly completely unrolled state. Wherein, from FIG. 1, FIG. 2, and FIG. 3, it can be understood that the rollable display device 100 includes the storage mechanism 10 and the actuating mechanism 20 fixedly connected to the storage mechanism 10.

In one embodiment of the present application, the storage mechanism 10 includes a storage mechanism 12 and a rotary component 11 dismountably connected to the storage component 12. Wherein, the storage component 12 is configured to store the flexible display panel 40 that is rolled, and the rotary component 11 is configured to roll up the flexible display panel 40.

In one embodiment of the present application, the storage component 12 includes a fixing member 121 and a connection member 122, and the fixing member 121 and the connection member 122 are configured to form a main body of the storage mechanism 10. Wherein, the actuating mechanism 20 is fixedly connected to the fixing member 121, and the connection member 122 is fixedly connected to the fixing member 121.

Specifically, the fixing member 121 includes a first fixing plate 1211 and a second fixing plate 1212, the connection member 122 includes a first connection plate 1221 located on a side of the fixing member 121 and a second connection plate 1222 located on another side of the fixing member 121.

Wherein, an end of the first connection plate 1221 is fixedly connected to the first fixing plate 1211, another end of the first connection plate 1221 is fixedly connected to the second fixing plate 1212, an end of the second connection plate 1222 is fixedly connected to the first fixing plate 1211, and another end of the second connection plate 1222 is fixedly connected to the second fixing plate 1212.

Please refer to FIG. 1, FIG. 2, and FIG. 3. In one embodiment of the present application, the rotary component 11 includes a rotary member 111, the rotary member 111 includes a first rotary plate 1111 and a second rotary plate 1112, the first rotary plate 1111 is rotatably connected to the first fixing plate 1211, and the second rotary plate 1112 is rotatably connected to the second fixing plate 1212.

Wherein, when the flexible display panel 40 is in a completely rolled-up state, in a direction parallel to the first rotating shaft 1121 or the second rotating shaft 1122, an orthogonal projection of the first rotary plate 1111 on the first fixing plate 1211 overlaps with the first fixing plate 1211, and an orthogonal projection of the second rotary plate 1112 on the second fixing plate 1212 overlaps with the second fixing plate 1212.

Please refer to FIG. 2. In one embodiment of the present application, the rotary component 11 further includes a rotating shaft member 112, the rotating shaft member 112 is configured to roll up the flexible display panel 40, the rotating shaft member 112 is disposed between the first rotary plate 1111 and the second rotary plate 1112.

Wherein, the second rotary plate 1112 simultaneously rotates with the first rotary plate 1111 through the rotating shaft member 112.

In one embodiment of the present application, the rotating shaft member 112 includes a first rotating shaft 1121 and a second rotating shaft 1122, a gap is formed between the second rotating shaft 1122 and the first rotating shaft 1121, and the gap is configured to provide a placement space for the rolled-up part of the flexible display panel 40.

Specifically, a first end of the first rotating shaft 1121 is rotatably connected to the first rotary plate 1111, a second end of the first rotating shaft 1121 is rotatably connected to the second rotary plate 1112, a first end of the second rotating shaft 1122 is rotatably connected to the first rotary plate 1111, and a second end of the second rotating shaft 1122 is rotatably connected to the second rotary plate 1112.

Wherein, the first rotating shaft 1121 and the second rotating shaft 1122 are rotatable relative to the rotary member 111.

In one embodiment of the present application, the first rotating shaft 1121 and the second rotating shaft 1122 are cylindrical.

In one embodiment of the present application, the first rotating shaft 1121 or the second rotating shaft 1122 is dismountably connected to the rotary member 111.

Please refer to FIG. 2. In one embodiment of the present application, the first actuating component 21 includes a first expansion link 211, a second expansion link 212, and a first connecting link 213 located between the first expansion link 211 and the second expansion link 212; a first end of the first expansion link 211 is fixedly connected to the first fixing plate 1211; a second end of the first expansion link 211 is fixedly connected to the first connecting link 213; a first end of the second expansion link 212 is fixedly connected to the second fixing plate 1212; and a second end of the first expansion link 212 is fixedly connected to the first connecting link 213.

The second actuating component 22 includes a third expansion link 221, a fourth expansion link 222, and a second connecting link 223 located between the third expansion link 221 and the fourth expansion link 222. A first end of the third expansion link 221 is fixedly connected to the first fixing plate 1211. A second end of the third expansion link 221 is fixedly connected to the second connecting link 223. A first end of the fourth expansion link 222 is fixedly connected to the second fixing plate 1212. A second end of the fourth expansion link 222 is fixedly connected to the second connecting link 223.

In one embodiment of the present application, any one of the first expansion link 211, the second expansion link 212, the third expansion link 221, or the fourth expansion link 222 includes a plurality of sleeves connected with each other end-to-end, and one of the plurality of sleeves is movably inserted in another adjacent one of the plurality of sleeves.

In another embodiment of the present application, any one of the first expansion link 211, the second expansion link 212, the third expansion link 221, or the fourth expansion link 222 can also be replaced with an air spring. Wherein, when the air spring moves away from the storage mechanism 10, there is no damping force; and when the air spring moves toward the direction close to the storage mechanism 10, there is a certain damping force. This is because when the air spring moves away from the storage mechanism 10, the air spring is stretched, and a valve in the air spring is opened, thereby reducing resistance between the air spring and the air, making no damping force exist during the air spring moving in the direction away from the storage mechanism 10; and when the air spring moves in the direction close to the storage mechanism 10, the air spring is compressed, and the valve in the air spring is closed, thereby increasing the resistance between the air spring and the air, making a certain damping force exist during the air spring moving in the direction close to the storage mechanism 10.

Figure 4:
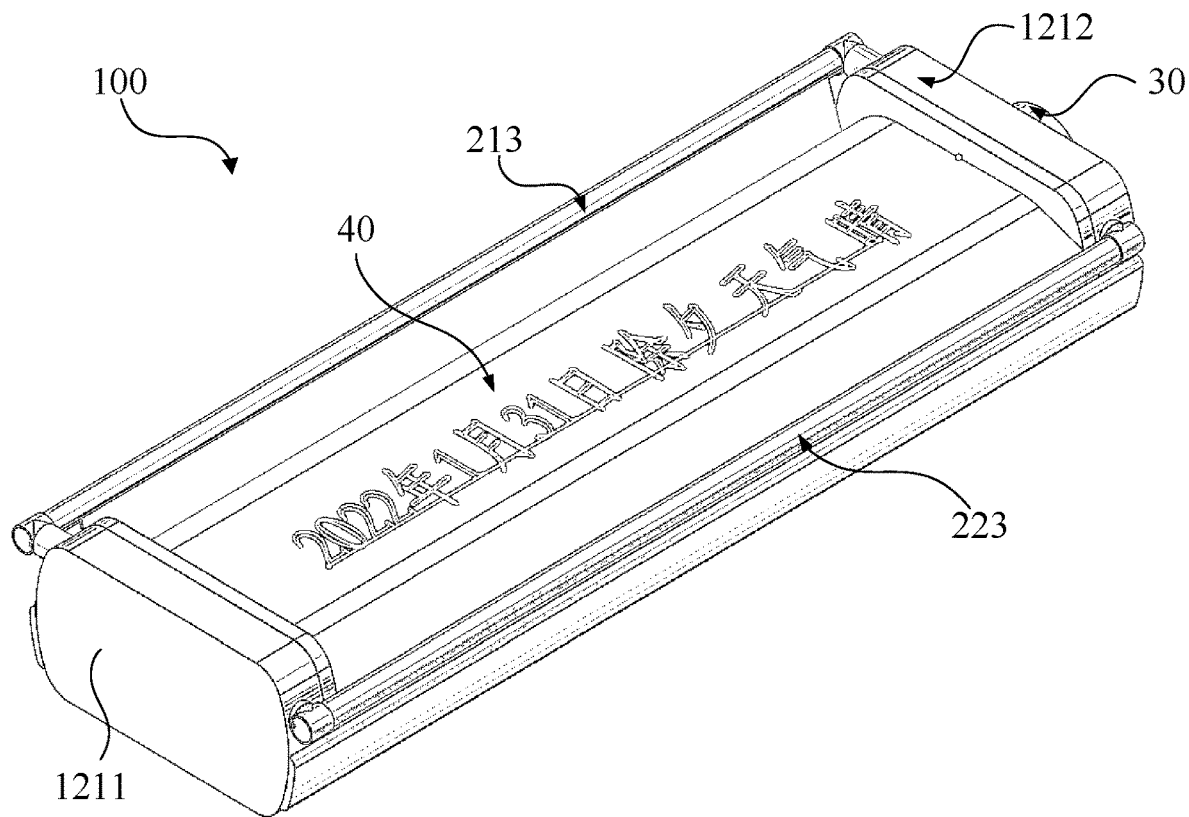
FIG. 4 is an axial view of the rollable display device provided by one embodiment of the present application in the completely rolled-up state.
Figure 5:
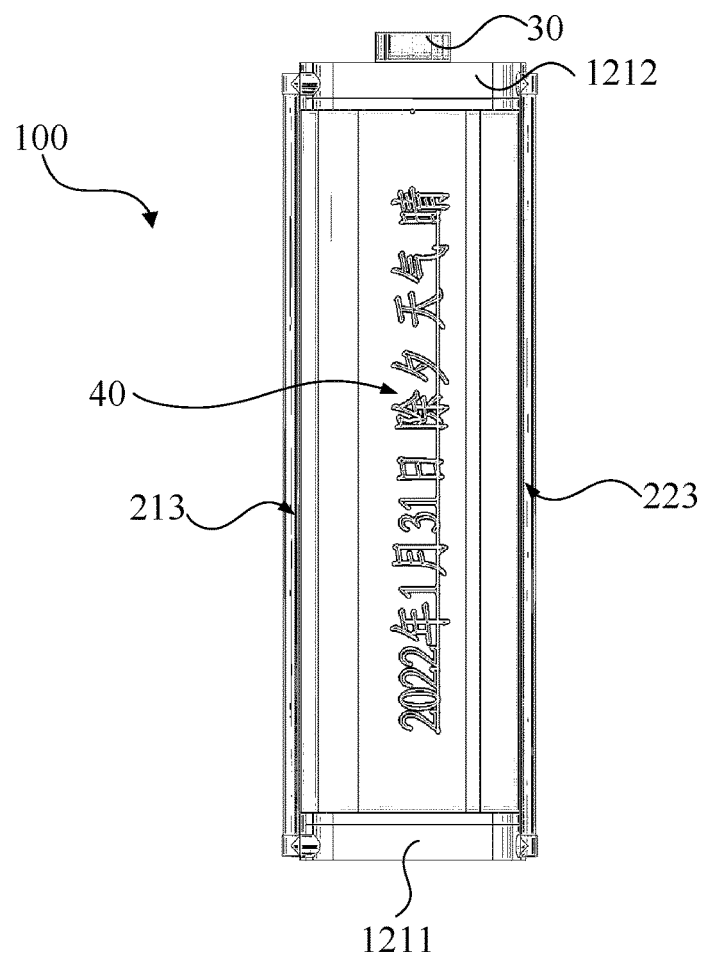
FIG. 5 is a front view of the rollable display device provided by one embodiment of the present application in the completely rolled-up state.
Figure 6:
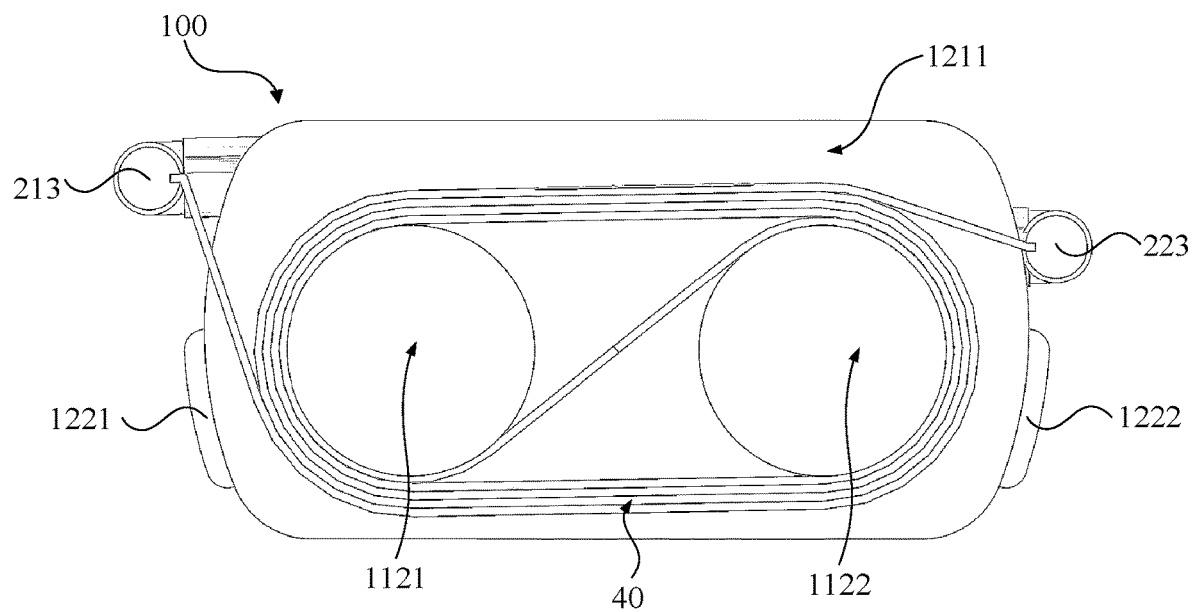
FIG. 6 is a lateral view of the rollable display device provided by one embodiment of the present application in the completely rolled-up state.

Illustrated in FIG. 4 is an axial view of the rollable display device 100 provided by one embodiment of the present application in the completely rolled-up state. Illustrated FIG. 5 is a front view of the rollable display device 100 provided by one embodiment of the present application in the completely rolled-up state. Illustrated in FIG. 6 is a lateral view of the rollable display device provided by one embodiment of the present application in the completely rolled-up state. Wherein, when the rollable display device 100 is in a completely rolled-up state, the first expansion link 211 and the third expansion link 221 are stored in the first fixing plate 1211, and the second expansion link 212 and the fourth expansion link 222 are stored in the second fixing plate 1212.

At this time, the rotating shaft member 112 supports a part of the flexible display panel 40 that is not rolled up in the storage mechanism 10.

Specifically, this part of the flexible display panel 40 that is not rolled up in the storage mechanism 10 is used for always on display of the rollable display device 100. When the flexible display panel 40 is working, a display region of the flexible display panel 40 that is not rolled up in the storage mechanism 10 can be used to display dates, weather, messages, missed calls, etc.

In one embodiment of the present application, the first connecting link 213 is fixedly connected to the first end of the flexible display panel 40, and the second connecting link 233 is fixedly connected to another end of the flexible display panel 40.

Wherein, the first connecting link 213 and the second connecting link 223 are rotatable relative to the storage mechanism 10. This design is to facilitate the first connecting link 213 and the second connecting link 223 to stretch or tighten the flexible display panel 40.

In one embodiment of the present application, the rollable display device 100 further includes a fasten member 30. The fasten member 30 is fixed in a side of the first fixing plate 1211 or the second fixing plate 1212 away from the flexible display panel 40, and the fasten member 30 is configured to drive the rotary member 111 to rotate to make the flexible display 40 panel be tightened, i.e., the fasten member 30 is mainly configured to provide a force of continuous tightening for the flexible display panel 40.

In one embodiment of the present application, the fasten member 30 includes a motor or a resilience device. Wherein, when the rollable display device 100 is changed from the unrolled state to the rolled-up state, the first expansion link 211, the second expansion link 212, the third expansion link 221, and the fourth expansion link 222 are retracted, and the motor or the resilience device drives the first rotary plate 1111 or the second rotary plate 1112 to roll up the flexible display panel 40. At this time, a direction of the flexible display panel 40 stored by the first rotating shaft 1121 is opposite to a direction of the flexible display panel 40 stored by the second rotating shaft 1122. This configuration can offset interlayer slip of the flexible display panel 40 when the flexible display panel 40 is from the unrolled state to the rolled-up state.

For example, this is similar during a book being folded, edges of the book will become thin and sharpened, which is the interlayer slip phenomenon. Because the flexible display panel 40 is also a structure in which many thin layers are attached together, the similar phenomenon can occur during folding or rolling. This phenomenon can be worsened as a number of rolled-up or folded layers increases, thereby causing damage to the flexible display panel 40. Therefore, this problem can be eased to a certain extent by using the first rotating shaft 1121 and the second rotating shaft 1122 to roll the flexible display panel 40 in opposite directions.

In one embodiment of the present application, the fasten member 30 is the motor. At this time, when the rollable display device 100 is changed from the unrolled state to the rolled-up state, the motor drives the rotating member 111 to rotate to make the flexible display panel 40 be rolled by the first rotating shaft 1121 and the second rotating shaft 1122. When the first actuating component 21 and the second actuating component 22 are relatively stationary with each other, the motor drives the rotary component 111 to continue to rotate to a certain angle to keep the flexible display panel 40 being tightened.

In another embodiment of the present application, the fasten member 30 is the resilience device. In this embodiment of the present application, the resilience device is a mainspring. At this time, when the rollable display device 100 is changed from the unrolled state to the rolled-up state, the resilience device is compressed. The resilience device drives the rotating member 111 to rotate to make the flexible display panel 40 be rolled by the first rotating shaft 1121 and the second rotating shaft 1122. After the first actuating component 21 and the second actuating component 22 are relatively stationary with each other, the inertia generated from the resilience device being compressed drives the rotary component 111 to continue to rotate to a certain angle to keep the flexible display panel 40 being tightened.

In one embodiment of the present application, the rollable display device 100 further includes a lock-up component. Wherein, when the first actuating component 21 and the second actuating component 22 are relatively stationary with each other, the lock-up component is configured to lock a relative positional relation between the fasten member 30 and the rotary component 11.

Specifically, the lock-up component is mainly configured to provide a brake function for flexible display panel 40 in the tightened state. The lock-up component can be any one of a plug-pin type lock-up component, an electronic lock type lock-up component, or a velcro type lock-up component. Wherein, during the process of the rollable display device 100 changed from the unrolled state to the rolled-up state, an external force drives the actuating component 20 to stretch the flexible display panel 40 to a certain extent to make the first actuating component 21 and the second actuating component 22 remain relatively static. At this time, the fasten member 30 receives a certain tensile force and is maintained in a stretched state, and the lock-up component needs to be used to lock the relative positional relation between the fasten member 30 and the rotary component 11.

In the process of the rollable display device 100 changing from the unrolled state to the rolled-up state, the lock-up component is released, and the fasten member 30 generates the resilient force due to being stretched, thereby driving the rotary component 111 to rotate reversely. Wherein, when the rollable display device 100 changes from the rolled-up state to the unrolled state, the rotation direction of the rotary component 111 is defined as forward rotation; and when the rollable display device 100 changes from the unrolled state to the rolled-up state, the rotation direction of the rotary component 111 is defined as reverse rotation. The rotary component 111 drives the rotating shaft member 112 to rotate reversely, so the rotating shaft member 112 rolls up the flexible display panel 40 along a direction close to the storage mechanism 10.

Figure 7:
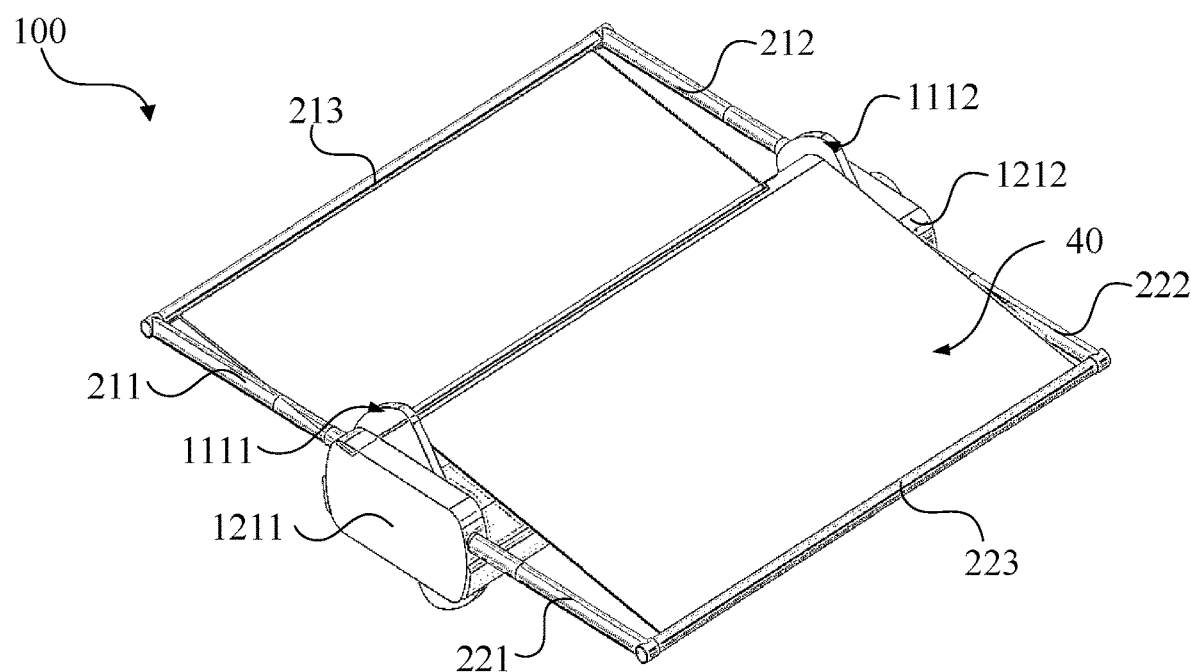
FIG. 7 is an axial view of the rollable display device provided by one embodiment of the present application during variation from the rolled-up state to the unrolled state.
Figure 8:
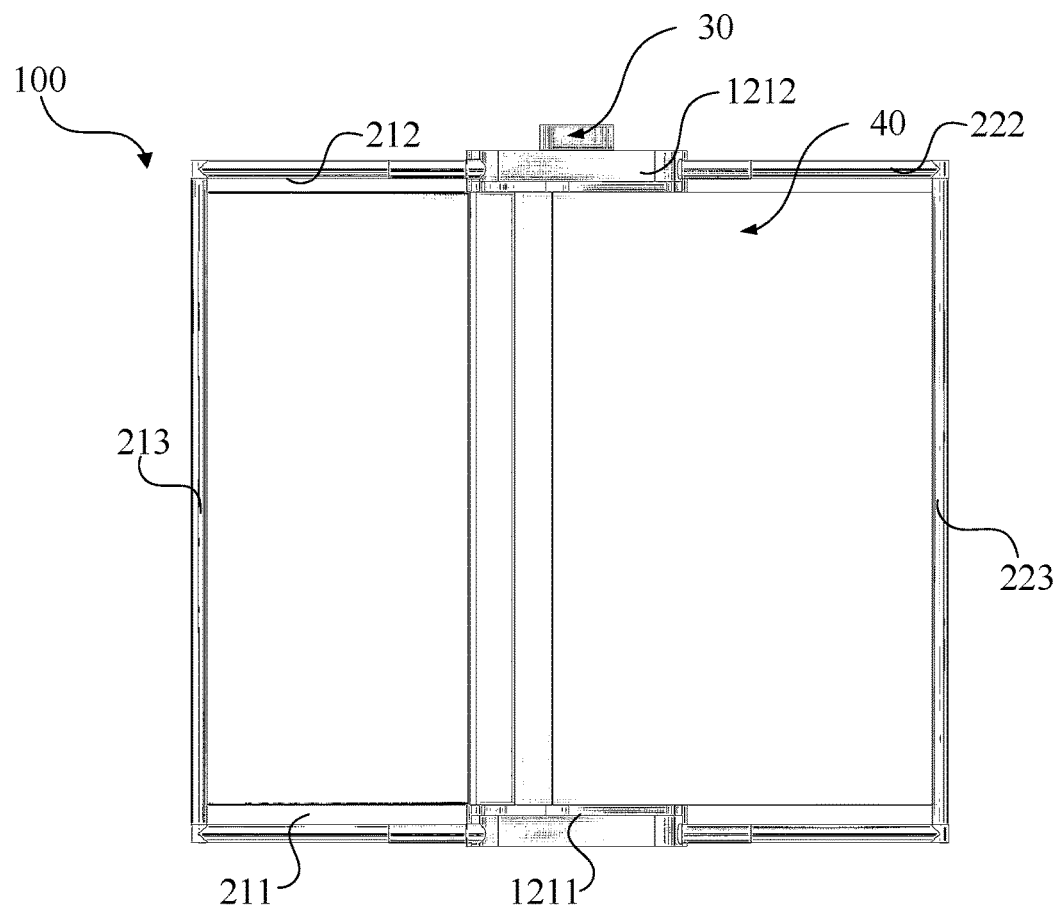
FIG. 8 is a front view of the rollable display device provided by one embodiment of the present application during variation from the rolled-up state to the unrolled state.

Illustrated in FIG. 7 is an axial view of the rollable display device 100 provided by one embodiment of the present application during variation from the rolled-up state to the unrolled state. Illustrated in FIG. 8 is a front view of the rollable display device 100 provided by one embodiment of the present application during variation from the rolled-up state to the unrolled state. Illustrated in FIG. 9 is a lateral view of the rollable display device 100 provided by one embodiment of the present application during variation from the rolled-up state to the unrolled state.

Specifically, in the aforesaid embodiments of the present application, the rolling process of the flexible display panel 40 in the rollable display device 100 is as follows.

Figure 9:
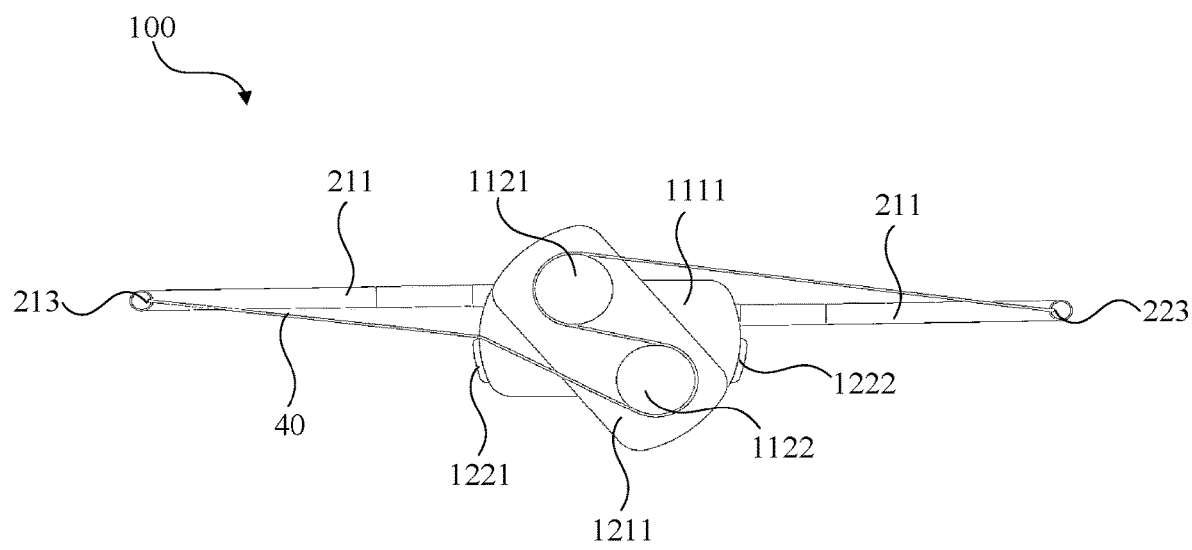
FIG. 9 is a lateral view of the rollable display device provided by one embodiment of the present application during variation from the rolled-up state to the unrolled state.

As illustrated in FIG. 7 to FIG. 9, the process of the rollable display device 100 transforming from a mobile phone mode to a tablet mode, i.e., the rollable display device 100 transforms from the completely rolled-up state to the completely unrolled state, is as follow.

First, an external driving force is provided to drive the actuating mechanism 20 to move, so that the first actuating mechanism 21 and the second actuating mechanism 22 slide relative to each other, and wherein the external driving force is a manual pull force or an electrical driving force.

Specifically, the first connecting link 213 and the second connecting link 223 are pulled manually or electrically, the first connecting link 213 drives the first expansion link 211, the third expansion link 221, and the first end of the flexible display panel 40 to move along a direction away from the storage mechanism 10, and the second connecting link 223 drives the second expansion link 212, the fourth expansion link 222, and the second end of the flexible display panel 40 to move along a direction away from the storage mechanism 10.

Afterwards, as the two ends of the flexible display panel 40 are stretched, and part of the flexible display panel 40 is rolled on the first rotating shaft 1121 and the second rotating shaft 1122, the stretched part of the flexible display panel 40 drives the first rotating shaft 1121 and the second rotating shaft 1122 to be in the forward rotation, and the first rotating shaft 1121 and the second rotating shaft 1122 drive the rotary member 111 to to be in the forward rotation, thereby making the first rotating shaft 1121 and the second rotating shaft 1122 to release more of the flexible display panel 40 until the part of the flexible display panel 40 stored by the rotating shaft member 112 is completely pulled out. At this time, the rotary member 111 drives the fasten member 30 to generate a part of the resilience force, and the fasten member 30 receives a certain tensile force and is maintained in the stretched state.

Finally, the lock-up component is in a locked state to lock the relative positional relation between the fasten member 30 and the rotary component 11, thereby making positions between the first actuating component 21 and the second actuating component 22 to remain relatively static.

Specifically, when the rollable display device 100 transforms from the completely rolled-up state to the completely unrolled state, the first rotating shaft 1121 and the second rotating shaft 1122 can rotate forwardly at 90°. Wherein, during the process of the forward rotation of the first rotating shaft 1121 or the second rotating shaft 1122, the first rotating shaft 1121 or the second rotating shaft 1122 can contact to the connection member 122. In order to prevent the flexible display panel 40 and the rotating shaft member 112 from being damaged due to contact, a plurality of anti-collision sub-members are disposed on a side of the connection member 122 close to the flexible display panel 40. In one embodiment of the present application, the anti-collision sub-members include a plurality of micro pulleys.

In another embodiment of the embodiments of the present application, lubricant can be coated on a surface of a side of the connection member 122 close to the flexible display panel 40 to reduce friction coefficient of the surface of the side of the connection member 122 close to the flexible display panel 40, thereby improving lubricity between the connection member 122 and the flexible display panel 40 to prevent damage to the flexible display panel 40 and the rotating shaft member 112 due to the contact.

In another situation of the embodiments of the present application, the process that the rollable display device 100 transforms from a tablet mode to a mobile phone mode (i.e., the rollable display device 100 transforms from the completely unrolled state to the completely rolled-up state) is as follows.

First, the lock-up component is in a released state. At this time, the fasten member 30 receives an effect of an elastic force to drive the rotary member 111 to rotate reversely.

Then, the rotary component 111 reversely rotates to drive the first rotating shaft 1121 and the second rotating shaft 1122 to rotate reversely. Therefore, the first rotating shaft 1121 and the second rotating shaft 1122 are allowed to roll up more flexible display panel 40 until the first expansion link 211 and the third expansion link 221 both stored in the first fixing plate 1211 and the second expansion link 212 and the fourth expansion link 222 both stored in the second fixing plate 1212. At this time, the flexible display panel 40 is in the completely rolled-up state, and an unrolled part of the flexible display panel 40 is used for always on display of the rollable display device 100. Wherein, because the first expansion link 211, the second expansion link 212, the third expansion link 221 and the fourth expansion link 222 can provide damping force during the resilience process, the transitioning process of the rollable display device 100 from the completely unrolled state to the completely rolled-up state is allowed to perform stably.

Figure 10:
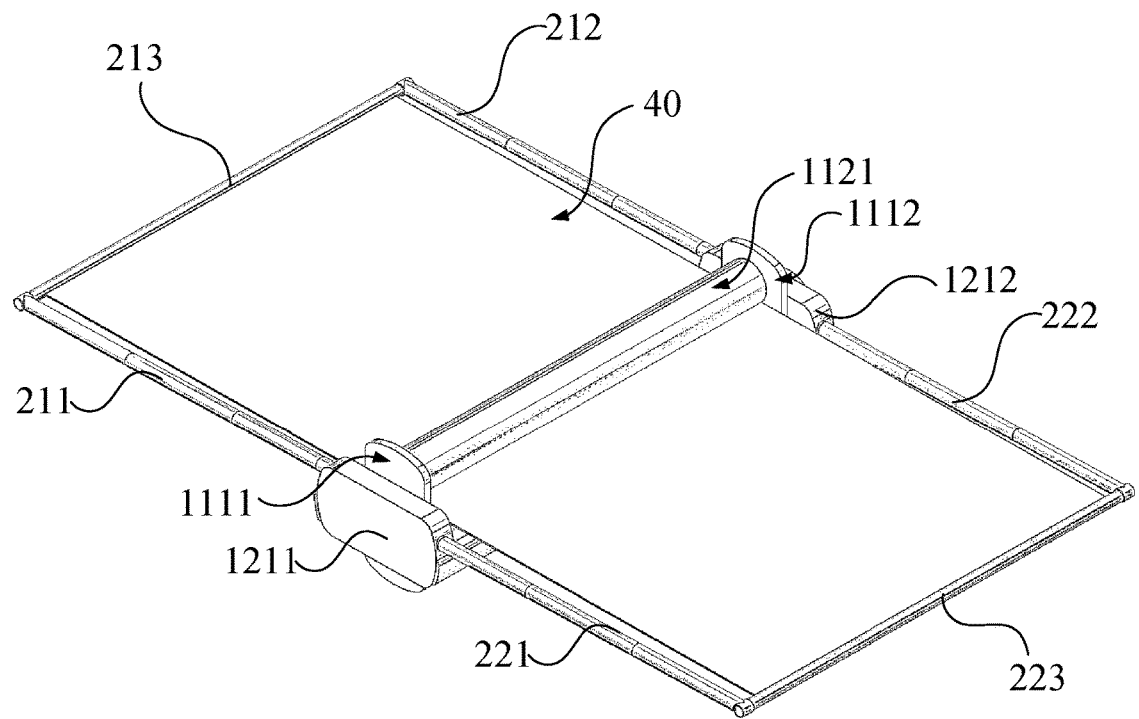
FIG. 10 is a first axial view of the rollable display device provided by one embodiment of the present application in the completely unrolled state.
Figure 11:
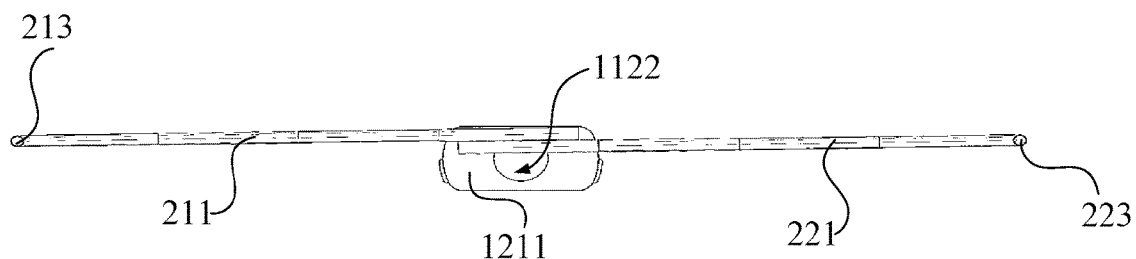
FIG. 11 is a first lateral view of the rollable display device provided by one embodiment of the present application in the completely unrolled state.

Illustrated in FIG. 10 is a first axial view of the rollable display device 100 provided by one embodiment of the present application in the completely unrolled state. Illustrated in FIG. 11 is a first lateral view of the rollable display device 100 provided by one embodiment of the present application in the completely unrolled state. Wherein, as illustrated in FIG. 10 and FIG. 11, when the first expansion link 211, the second expansion link 212, the third expansion link 221, and the fourth expansion link 222 are stretched to the longest, the flexible display panel 40 is in a completely flat state; and the flexible display panel 40 is located between the first rotating shaft 1121 and the second rotating shaft 1122 because the first rotating shaft 1121 and the second rotating shaft 1122 rotates forwardly at 90°. Therefore, for the purpose of not affecting the display effect of the rollable display device 100, the first rotating shaft 1121 located on the front of the flexible display panel 40 can be manually removed, and the removed first rotating shaft 1121 can be used for a stylus pen, a support frame, a remote control, etc. of the flexible display panel 40.

In one embodiment of the present application, when the flexible display panel 40 is in the completely unrolled state, the first actuating component 21 and the second actuating component 22 are disposed in a staggered manner along a length direction parallel to the flexible display panel 40. Because the first actuating component 21 and the second actuating component 22 are not placed horizontally, when the first actuating component 21 and the second actuating component 22 move in directions away from the storage mechanism 10, a bottom surface of an end of the first connecting link 213 away from the storage mechanism 10 and a top surface of an end of the second actuating component 22 away from the storage mechanism 10 are exactly on a same horizontal level, thereby ensuring the flexible display panel 40 to be fully flat and not tilted.

Figure 12:
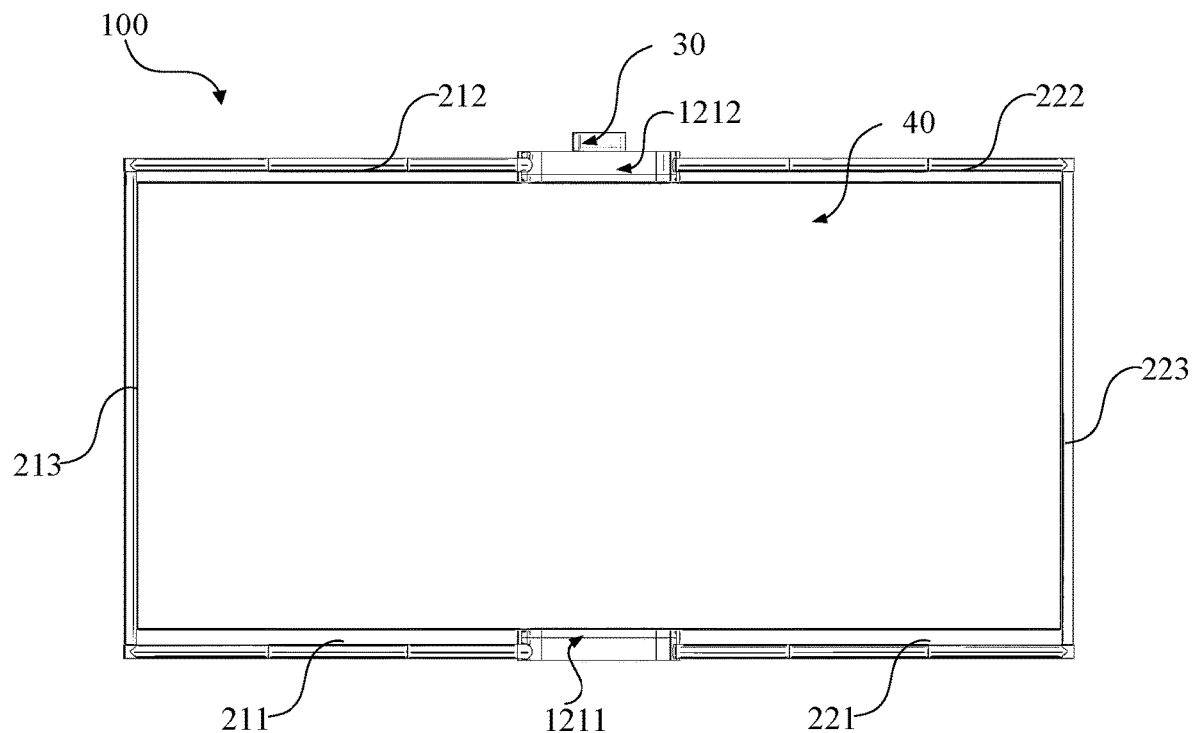
FIG. 12 is a second axial view of the rollable display device provided by one embodiment of the present application in the completely unrolled state.
Figure 13:
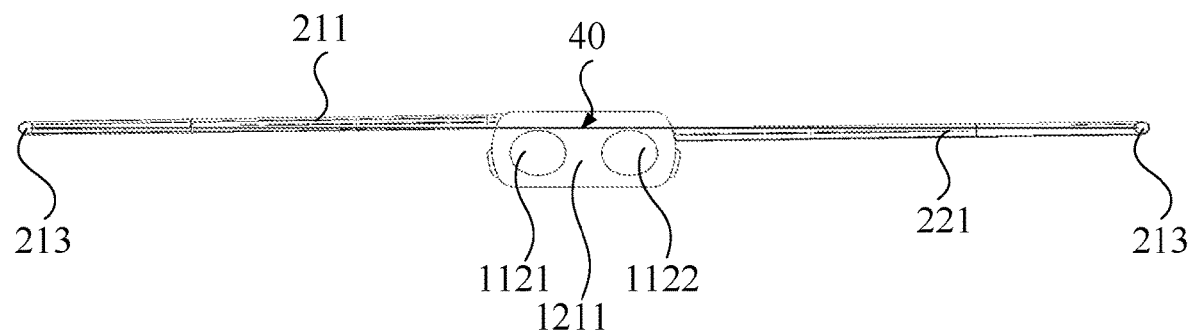
FIG. 13 is a second lateral view of the rollable display device provided by one embodiment of the present application in the completely unrolled state.

Illustrated in FIG. 12 is a second axial view of the rollable display device 100 provided by one embodiment of the present application in the completely unrolled state. Illustrated FIG. 13 is a second lateral view of the rollable display device 100 provided by one embodiment of the present application in the completely unrolled state. Wherein, as illustrated in FIG. 12 and FIG. 13, when the first expansion link 211, the second expansion link 212, the third expansion link 221, and the fourth expansion link 222 are stretched to the longest, the flexible display panel 40 is in a completely flat state; and the flexible display panel 40 is located between the first rotating shaft 1121 and the second rotating shaft 1122 because the first rotating shaft 1121 and the second rotating shaft 1122 rotates forwardly at 90°. Therefore, for the purpose of not affecting the display effect of the rollable display device 100, the first rotating shaft 1121 located on the front of the flexible display panel 40 can be manually removed. Then, the rotary component 111 is returned, and the removed first rotating shaft 1121 is inserted back between the first rotary plate 1111 and the second rotary plate 1112, thereby not affecting display of the flexible display panel 40. At this time, the first rotating shaft 1121 and the second rotating shaft 1122 simultaneously support the flexible display panel 40.

Compared to the prior art, the rollable display device 100 provided by the embodiments of the present application have advantages as follows.

First, the first rotating shaft 1121 and the second rotating shaft 1122 rotating with the rotary member 111 can be adopted in the rollable display device 100, and the direction in which the first rotating shaft 1121 stores the flexible display panel 40 is opposite to the direction in which the second rotating shaft 1122 stores the flexible display panel 40, so the interlayer slip generated during the flexible display panel 40 being tightened or stretched can be offset. Meanwhile, bidirectional stretching is allowed to realize in the flexible display panel 40 under movement of the actuating mechanism 20, thereby increasing a rolled-up radius of the flexible display panel 40. In this way, the stored part of the flexible display panel 40 is always substantially kept on the rotary component 11 during the unrolled and rolled-up processes, which prevents the problem that the flexible display pane 40 is damaged incurred by being squeezed against the storage structure during the unrolled and rolled-up processes. On another aspect, the rolling solution with double shafts of bidirectional stretching is adopted in the rollable display device 100 provided by the embodiments of the present application, and its storage speed can be twice of the storage speed of the rollable display device 100 of the traditional rolling solution with single shaft stretched in one way.

Second, the design that the actuating mechanism 20 is combined with the fasten member 30 is adopted in the rollable display device 100. When the flexible display panel 40 is rolled up or unrolled, forces of the first expansion link 211, the second expansion link 212, the third expansion link 221, the fourth expansion link 222 and the fasten member 30 offset with each other, which can make the flexible display panel 40 more stable during the variation process from the rolled-up state to the unrolled state.

Third, the design that the first rotating shaft 1121 and the second rotating shaft 1122 are dismountably connected to the rotary component 111 respectively is adopted in the rollable display device 100. Therefore, when the first expansion link 211, the second expansion link 212, the third expansion link 221, and the fourth expansion link 222 are stretched to the longest, the flexible display panel 40 is in the completely flat state; and the flexible display panel 40 is located between the first rotating shaft 1121 and the second rotating shaft 1122 because the first rotating shaft 1121 and the second rotating shaft 1122 rotates forwardly at 90°. Therefore, for the purpose of not affecting the display effect of the rollable display device 100, the first rotating shaft 1121 located on the front of the flexible display panel 40 can be manually removed to obtain better visual experience.

Fourth, when the flexible display panel 40 is in the completely unrolled state, the first actuating component 21 and the second actuating component 22 are disposed in the staggered manner along the length direction parallel to the flexible display panel 40. Because the first actuating component 21 and the second actuating component 22 are not placed horizontally, when the first actuating component 21 and the second actuating component 22 move along the directions away from the storage mechanism 10, the bottom surface of one end of the first connecting link 213 away from the storage mechanism 10 and the top surface of one end of the second actuating component 22 away from the storage mechanism 10 are exactly on a same horizontal level, thereby ensuring the flexible display panel 40 to be fully flat and not tilted when the flexible display panel 40 is in the completely unrolled state.

In the embodiments mentioned above, the descriptions to the various embodiments are emphasized, and the part is not described in detailed in an embodiment, can refer to the detailed description of other embodiments mentioned above.

The rollable display device provided by the embodiments of the present disclosure are described in detail. This article uses specific cases for describing the principles and the embodiments of the present disclosure, and the description of the embodiments mentioned above is only for helping to understand the method and the core idea of the present disclosure. Meanwhile, for those skilled in the art, will have various changes in specific embodiments and application scopes according to the idea of the present disclosure. In summary, the content of the specification should not be understood as limit to the present disclosure.

What is claimed is:

1. A rollable display device, comprising:
   a flexible display panel;
   a storage mechanism, wherein a rotary component is disposed in the storage mechanism, the rotary component in the storage mechanism is configured to roll up the flexible display panel,
   the storage mechanism is configured to store the flexible display panel that is rolled,
   the rotary component comprises a rotary member and a rotating shaft member, the rotating shaft member is rotatably connected to the rotary member, and the rotating shaft member comprises a first rotating shaft and a second rotating shaft; and
   an actuating mechanism fixedly connected to the storage mechanism, wherein the actuating mechanism comprises a first actuating component and a second actuating component, the storage mechanism is located between the first actuating component and the second actuating component, the first actuating component is fixedly connected to a first end of the flexible display panel, the second actuating component is fixedly connected to a second end of the flexible display panel; and
   wherein the storage mechanism comprises a storage component, the storage component comprises a fixing member and a connection member, the actuating mechanism is fixedly connected to the fixing member, and the connection member is fixedly connected to the fixing member;
   wherein the fixing member comprises a first fixing plate and a second fixing plate, the connection member comprises a first connection plate located on a side of the fixing member and a second connection plate located on another side of the fixing member;
   wherein an end of the first connection plate is fixedly connected to the first fixing plate, another end of the first connection plate is fixedly connected to the second fixing plate, an end of the second connection plate is fixedly connected to the first fixing plate, and another end of the second connection plate is fixedly connected to the second fixing plate;
   wherein the rotary member comprises a first rotary plate and a second rotary plate, the first rotary plate is rotatably connected to the first fixing plate, and the second rotary plate is rotatably connected to the second fixing plate;
   wherein when the flexible display panel is in a completely rolled-up state, in a direction parallel to the first rotating shaft or the second rotating shaft, an orthogonal projection of the first rotary plate on the first fixing plate overlaps with the first fixing plate, and an orthogonal projection of the second rotary plate on the second fixing plate overlaps with the second fixing plate; and
   wherein when the first actuating component and the second actuating component slide relative to each other, a rotation direction of the first rotating shaft is opposite to a rotation direction of the second rotating shaft, and at least one end of the flexible display panel moves away from or close to the storage mechanism.

2. The rollable display device as claimed in claim 1, wherein the rotating shaft member is disposed between the first rotary plate and the second rotary plate; and
   wherein the second rotary plate simultaneously rotates with the first rotary plate through the rotating shaft member.

3. The rollable display device as claimed in claim 2, wherein a first end of the first rotating shaft is rotatably connected to the first rotary plate, a second end of the first rotating shaft is rotatably connected to the second rotary plate, a first end of the second rotating shaft is rotatably connected to the first rotary plate, and a second end of the second rotating shaft is rotatably connected to the second rotary plate; and wherein the first rotating shaft and the second rotating shaft are rotatable relative to the rotary member.

4. The rollable display device as claimed in claim 3, wherein when the flexible display panel is in a completely unrolled state, two ends of the flexible display panel are located in a same horizontal level; and
wherein the flexible display panel is located between the first rotating shaft and the second rotating shaft.

5. The rollable display device as claimed in claim 3, wherein the first rotating shaft or the second rotating shaft is dismountably connected to the rotary member.

6. The rollable display device as claimed in claim 3, wherein the first actuating component comprises a first expansion link, a second expansion link, and a first connecting link located between the first expansion link and the second expansion link; a first end of the first expansion link is fixedly connected to the first fixing plate; a second end of the first expansion link is fixedly connected to the first connecting link; a first end of the second expansion link is fixedly connected to the second fixing plate; and a second end of the second expansion link is fixedly connected to the first connecting link.

7. The rollable display device as claimed in claim 6, wherein the second actuating component comprises a third expansion link, a fourth expansion link, and a second connecting link located between the third expansion link and the fourth expansion link; a first end of the third expansion link is fixedly connected to the first fixing plate; a second end of the third expansion link is fixedly connected to the second connecting link; a first end of the fourth expansion link is fixedly connected to the second fixing plate; and a second end of the fourth expansion link is fixedly connected to the second connecting link.

8. The rollable display device as claimed in claim 7, wherein any one of the first expansion link, the second expansion link, the third expansion link, or the fourth expansion link comprises a plurality of sleeves connected with each other end-to-end, and one of the plurality of sleeves is movably inserted in another adjacent one of the plurality of sleeves.

9. The rollable display device as claimed in claim 7, wherein the first connecting link is fixedly connected to the first end of the flexible display panel, and the second connecting link is fixedly connected to another end of the flexible display panel; and
wherein the first connecting link and the second connecting link are rotatable relative to the storage mechanism.

10. The rollable display device as claimed in claim 7, wherein when the flexible display panel is in the completely rolled-up state, the first expansion link and the third expansion link are stored in the first fixing plate, and the second expansion link and the fourth expansion link are stored in the second fixing plate.

11. The rollable display device as claimed in claim 10, wherein when the flexible display panel is in the completely rolled-up state, the rotating shaft member supports a part of the flexible display panel that is not rolled up in the storage mechanism.

12. The rollable display device as claimed in claim 1, wherein the rollable display device comprises a fasten member, the fasten member is fixed in a side of the first fixing plate or the second fixing plate away from the flexible display panel, and the fasten member is configured to drive the rotary member to rotate to make the flexible display panel be tightened.

13. The rollable display device as claimed in claim 12, wherein the fasten member comprises a motor or a resilience device.

14. The rollable display device as claimed in claim 12, wherein the rollable display device comprises a lock-up component; and
wherein when the first actuating component and the second actuating component are relatively stationary with each other, the lock-up component is configured to lock a relative positional relation between the fasten member and the rotary component.

15. The rollable display device as claimed in claim 1, wherein a plurality of anti-collision sub-members are disposed on a side of the connection member close to the flexible display panel.

16. The rollable display device as claimed in claim 1, wherein when the flexible display panel is in the completely unrolled state, the first actuating component and the second actuating component are disposed in a staggered manner along a length direction parallel to the flexible display panel.

17. The rollable display device as claimed in claim 3, wherein when the flexible display panel is in the completely unrolled state, at least one of the first rotating shaft or the second rotating shaft supports the flexible display panel.

* * * * *